Patented May 20, 1930

1,759,249

UNITED STATES PATENT OFFICE

KARL WILKE AND JOSEF STOCK, OF HOCHST-ON-THE-MAIN, GERMANY, ASSIGNORS TO GENERAL ANILINE WORKS, INC., OF NEW YORK, N. Y., A CORPORATION OF DELAWARE

VAT DYESTUFFS OF ANTHRACENE SERIES CONTAINING NITROGEN AND PROCESS OF PREPARING SAME

No Drawing. Application filed June 21, 1926, Serial No. 117,568, and in Germany July 2, 1925.

Our present invention relates to the preparation of vat dyestuffs containing nitrogen.

By the action of nitrating agents upon a Bz-1-halogenbenzanthrone there are obtained nitrohalogenbenzanthrones containing the nitro group in the anthraquinone residue of the benzanthrone which is proved by the fact that when they are degradated by oxidation they yield nitroanthraquinone-1-carboxylic acids.

Now we have found that aminohalogenbenzanthrones, obtainable from the above mentioned nitro products are not substituted in the 2-position and therefore can be condensed by melting them with alkaline condensing agents and that in this way valuable vat dyestuffs are obtained. They are dibenzanthrone derivatives containing nitrogen which differ from the products which are obtained if a previously formed dibenzanthrone or iso-dibenzanthrone (compare U. S. Patents Nos. 796,393 and 1,063,000) is nitrated and then reduced.

The vat dyestuffs which can be prepared by our new process are of particular commercial value owing to the remarkable tint they give.

The following examples serve to illustrate our invention, but are not intended to limit it thereto:

1. 10 parts by weight of aminobromobenzanthrone which has its melting point at 274° C. to 275° C. (produced by reducing nitro-Bz-1-bromobenzanthrone of melting point 290° C.) are introduced, while stirring, into a mixture heated at 140° C. of 60 parts of caustic alkali and 75 parts of alcohol and the resulting molten mass is kept at 140° C. to 150° C. for ¾ hours. The mass is then poured into water, and by blowing air into it the leuco compound, being in solution, is precipitated and afterwards filtered and washed. The dyestuff thus obtained forms a dark colored paste and, when dry, an almost black powder which dissolves in concentrated sulfuric acid with a brown color of a violet hue. It dyes cotton from a bluish-violet vat directly reddish-grey to black tints which, when treated with chlorine, assume a green hue.

Analysis of the crude dyestuff shows a nitrogen content of 4.25 per cent, i. e., a value which approaches the theoretical amount of nitrogen (5.76 per cent) calculated for a diaminodibenzanthrone.

Contrary thereto the nitrated violanthrone produced by the process described in U. S. Patent No. 793,393 yields, as is known, green dyeings on cotton which, on being chlorinated, change to a color varying from grey to black, whereas nitrated isoviolanthrone (see U. S. Patent No. 1,063,000) gives on cotton greenish-blue tints.

2. If for the bromaminobenzanthrone used according to Example 1 is substituted the amino-Bz-1-chlorobenzanthrone which has its melting point at 290° C. to 291° C. (obtained from Bz-1-chloronitrobenzanthrone of melting point 284° C. to 285° C.), a dyestuff possessing almost the same tinctorial properties is obtained. The fact that the dyestuff gives a green solution in concentrated sulfuric acid proves that the product obtained according to the present example constitutes chemically a purer isodibenzanthrone derivative.

We claim:

1. Process for preparing new vat dyestuffs of the anthracene series containing nitrogen which consists in treating with caustic alkali an amino-Bz-1-halogen-benzanthrone compound, produced by acting with a nitrating agent upon a Bz-1-halogen-benzanthrone and reducing the nitrated compound thus obtained.

2. As new products vat dyestuffs of the anthracene series containing nitrogen which are in a dry state almost black powders, dye cotton from a bluish violet vat directly reddish gray to black tints which when treated with chlorine assume a green hue, dissolve in concentrated sulfuric acid with a brown to green color, and are obtainable by treating with caustic alkali the amino-Bz-1-halogen-benzanthrone compounds produced by acting with nitrating agents upon a Bz-1-halogen-benzanthrone and reducing the nitrated compound thus obtained.

3. The process for preparing new vat dyestuffs of the anthracene series containing nitrogen which consists in treating with caustic alkali the amino-Bz-1-bromo-benzanthrone, having the melting point 274° C. to 275° C., produced by acting with a nitrating agent upon Bz-1-bromo-benzanthrone and reducing the nitrated compound having the melting point 290° C., thus obtained.

4. The process for preparing vat dyestuffs of the anthracene series containing nitrogen which consists in treating with caustic alkali in the presence of alcohol at a temperature of 140° C. to 150° C. an amino-Bz-1-halogen-benzanthrone compound, produced by acting with a nitrating agent upon a Bz-1-halogen-benzanthrone and reducing the nitrated compound thus obtained.

5. The process for preparing vat dyestuffs of the anthracene series containing nitrogen which consists in treating with caustic alkali in the presence of alcohol at a temperature of 140° C. to 150° C. an amino-Bz-1-bromo-benzanthrone compound, having the melting point 274° C. to 275° C., produced by acting with a nitrating agent upon a Bz-1-bromo-benzanthrone and reducing the nitrated compound having the melting point 290° C. thus obtained.

6. As a new product a vat dyestuff of the anthracene series containing nitrogen which is in a dry state an almost black powder, dyes cotton from a bluish violet vat directly reddish gray to black tints which when treated with chlorine assume a weak green hue, dissolves in concentrated sulfuric acid to a brown solution with a violet hue, and can be obtained by treating with caustic alkali the amino-Bz-1-bromo-benzanthrone having the melting point 274° C. to 275° C., produced by acting with a nitrating agent upon Bz-1-bromo-benzanthrone and reducing the nitrated compound having the melting point 290° C., thus obtained.

In testimony whereof, we affix our signatures.

KARL WILKE.
JOSEF STOCK.

CERTIFICATE OF CORRECTION.

Patent No. 1,759,249.  Granted May 20, 1930, to

KARL WILKE ET AL.

It is hereby certified that error appears in the printed specification of the above numbered patent requiring correction as follows: Page 1, line 58, for "793,393" read "796,393"; and that the said Letters Patent should be read with this correction therein that the same may conform to the record of the case in the Patent Office.

Signed and sealed this 22nd day of July, A. D. 1930.

Wm. A. Kinnan
Acting Commissioner of Patents.

(Seal)

alkali the amino-Bz-1-bromo-benzanthrone, having the melting point 274° C. to 275° C., produced by acting with a nitrating agent upon Bz-1-bromo-benzanthrone and reducing the nitrated compound having the melting point 290° C., thus obtained.

4. The process for preparing vat dyestuffs of the anthracene series containing nitrogen which consists in treating with caustic alkali in the presence of alcohol at a temperature of 140° C. to 150° C. an amino-Bz-1-halogen-benzanthrone compound, produced by acting with a nitrating agent upon a Bz-1-halogen-benzanthrone and reducing the nitrated compound thus obtained.

5. The process for preparing vat dyestuffs of the anthracene series containing nitrogen which consists in treating with caustic alkali in the presence of alcohol at a temperature of 140° C. to 150° C. an amino-Bz-1-bromo-benzanthrone compound, having the melting point 274° C. to 275° C., produced by acting with a nitrating agent upon a Bz-1-bromo-benzanthrone and reducing the nitrated compound having the melting point 290° C. thus obtained.

6. As a new product a vat dyestuff of the anthracene series containing nitrogen which is in a dry state an almost black powder, dyes cotton from a bluish violet vat directly reddish gray to black tints which when treated with chlorine assume a weak green hue, dissolves in concentrated sulfuric acid to a brown solution with a violet hue, and can be obtained by treating with caustic alkali the amino-Bz-1-bromo-benzanthrone having the melting point 274° C. to 275° C., produced by acting with a nitrating agent upon Bz-1-bromo-benzanthrone and reducing the nitrated compound having the melting point 290° C., thus obtained.

In testimony whereof, we affix our signatures.

KARL WILKE.
JOSEF STOCK.

CERTIFICATE OF CORRECTION.

Patent No. 1,759,249.    Granted May 20, 1930, to

KARL WILKE ET AL.

It is hereby certified that error appears in the printed specification of the above numbered patent requiring correction as follows: Page 1, line 58, for "793,393" read "796,393"; and that the said Letters Patent should be read with this correction therein that the same may conform to the record of the case in the Patent Office.

Signed and sealed this 22nd day of July, A. D. 1930.

Wm. A. Kinnan
Acting Commissioner of Patents.

(Seal)